US010981132B2

(12) United States Patent
Ostraat

(10) Patent No.: US 10,981,132 B2
(45) Date of Patent: Apr. 20, 2021

(54) AEROSOLIZATION METHOD FOR PRODUCING SOLID PRODUCT PARTICLES HAVING DESIRED CHARACTERISTICS FROM PRECURSOR PARTICLES

(71) Applicant: Saudi Arabian Oil Company, Dhahran (SA)

(72) Inventor: Michele L. Ostraat, Somerville, MA (US)

(73) Assignee: Saudi Arabian Oil Company, Dhahran (SA)

( * ) Notice: Subject to any disclaimer, the term of this patent is extended or adjusted under 35 U.S.C. 154(b) by 341 days.

(21) Appl. No.: 16/177,794

(22) Filed: Nov. 1, 2018

(65) Prior Publication Data

US 2020/0139324 A1  May 7, 2020

(51) Int. Cl.
*B01J 2/18* (2006.01)
*B01J 13/00* (2006.01)
*B01J 19/10* (2006.01)

(52) U.S. Cl.
CPC .............. *B01J 2/18* (2013.01); *B01J 13/0095* (2013.01); *B01J 19/10* (2013.01); *B01J 2219/0881* (2013.01)

(58) Field of Classification Search
CPC . B01J 2/18; B01J 13/0095; B01J 19/10; B01J 2219/0881; B01J 35/0006; B01J 37/343; B01J 37/0232; B01J 37/04; B01J 29/40; B01J 23/30; B01J 35/023; B01J 2/04
See application file for complete search history.

(56) References Cited

U.S. PATENT DOCUMENTS 5,878,355 A * 3/1999 Berg ................... B01J 13/0095
427/212
6,660,680 B1  12/2003 Hampden-Smith et al.
(Continued)

FOREIGN PATENT DOCUMENTS

EP       1992993 A2    11/2008

OTHER PUBLICATIONS

Written Opinion of the International Preliminary Examining Authority in Corresponding PCT Application No. PCT/US2019/059045 dated Sep. 16, 2020. 5 pages.
(Continued)

*Primary Examiner* — Nahida Sultana
(74) *Attorney, Agent, or Firm* — Leason Ellis LLP

(57) ABSTRACT

The present application provides aerosol processes for selectively incorporating properties of solid precursor particles into processed materials is provided. In one aspect, a carrier gas and a precursor mixture are injected into an aerosol generator. The precursor mixture includes solid precursor particles and a liquid component. One or more ultrasonic transducers are applied to the precursor mixture in the aerosol generator to aerosolize a portion of the precursor mixture that comprises solid particles that are smaller than a predetermined size. The aerosolized portion of the precursor mixture is transferred, via the carrier gas, into a reactor. The aerosolized portion in the reactor is then dried and sometimes reacted to produce solid product particles, and the solid product particles are collected in a particle collector.

20 Claims, 9 Drawing Sheets

(56) References Cited

U.S. PATENT DOCUMENTS

Figure 1A:
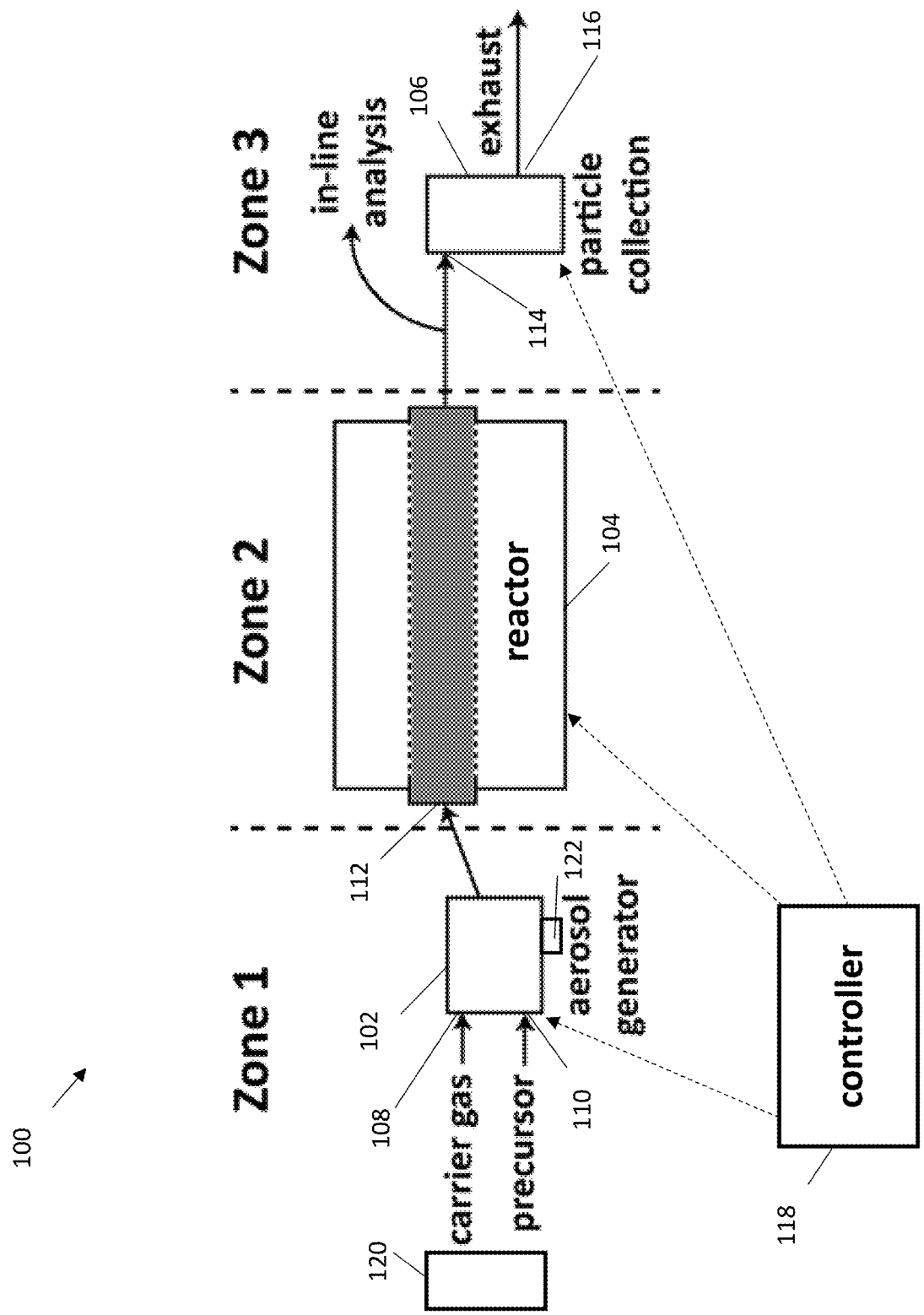

| | | | |
|---|---|---|---|
| 6,685,762 B1* | 2/2004 | Brewster | B01J 2/04 |
| | | | 264/12 |
| 6,780,350 B1 | 8/2004 | Kodas et al. | |
| 7,150,920 B2* | 12/2006 | Kodas | B01J 2/02 |
| | | | 428/570 |
| 8,246,933 B2 | 8/2012 | Jiang et al. | |
| 9,427,727 B2 | 8/2016 | Tateno et al. | |
| 2001/0051118 A1 | 12/2001 | Mosso et al. | |
| 2007/0264187 A1* | 11/2007 | Harutyunyan | B01J 8/1845 |
| | | | 423/447.3 |
| 2010/0139336 A1* | 6/2010 | Necchi | E05B 73/0005 |
| | | | 70/57.1 |
| 2014/0083628 A1* | 3/2014 | Khan | B01D 1/18 |
| | | | 159/4.01 |
| 2014/0088768 A1* | 3/2014 | Haley | B01J 2/04 |
| | | | 700/283 |
| 2017/0136445 A1 | 5/2017 | Ostraat et al. | |
| 2017/0320747 A1 | 11/2017 | Ostraat | |

OTHER PUBLICATIONS

International Search Report and Written Opinion in Corresponding Patent Application PCT/US2019/059045 dated Feb. 11, 2020. 11 pages.

International Preliminary Report on Patentability in Corresponding PCT Application No. PCT/US2019/059045 dated Dec. 21, 2020. 11 pages.

* cited by examiner

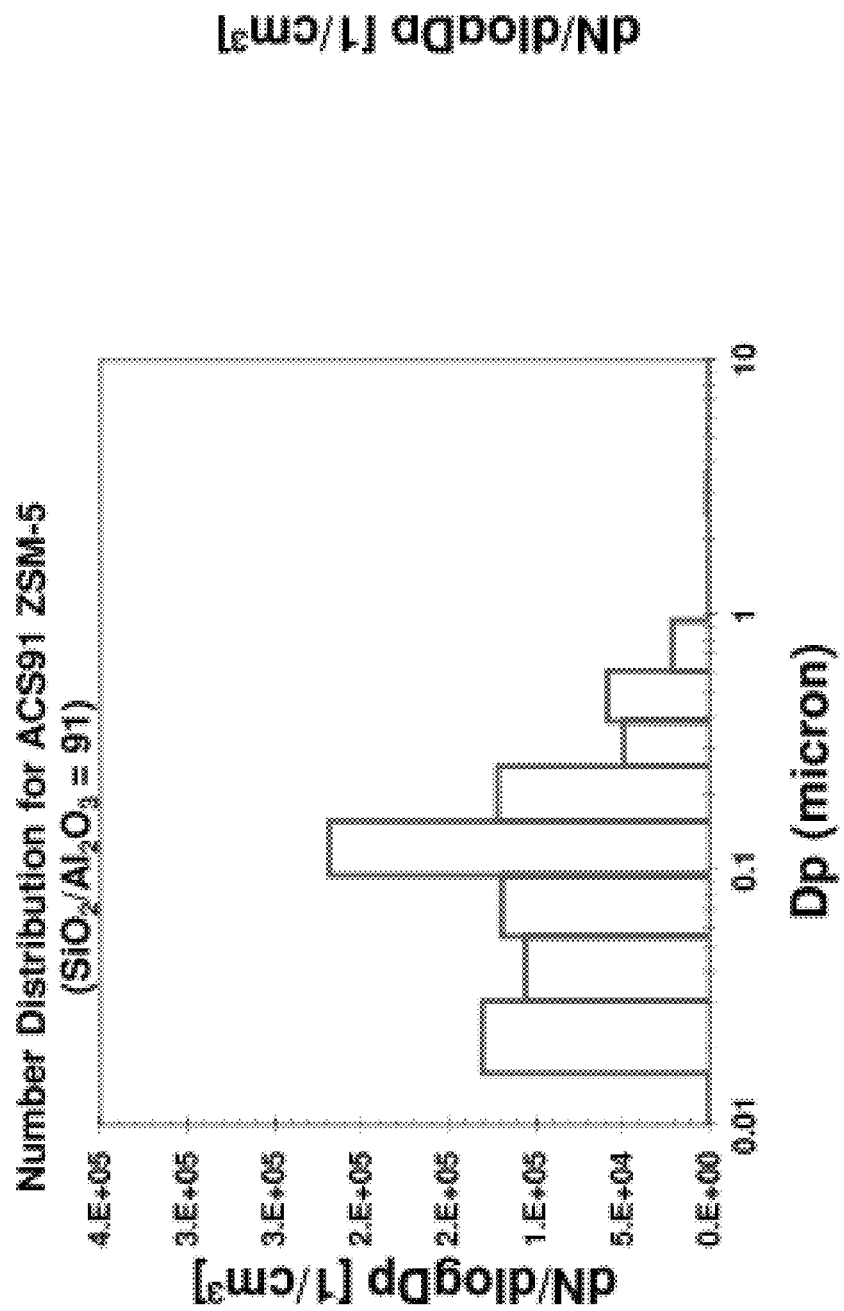

Fig. 4

| Zone 1 | | | |
|---|---|---|---|
| Precursor | | Aerosol generator | |
| *Fixed parameters* | *Values* | *Fixed parameters* | *Values* |
| $T_g$ : initial temperature, °C | 25 | $A_s$ : atomization source[e] | 4 |
| $t_{son}$ : sonication time, min | 20 | $G_c$ : carrier gas composition | air[f] |
| | | $T_g$ : gas inlet temperature, °C | 25 |
| *Varied parameters* | *Values* | $P$ : system pressure, kPa | 101.3 |
| $N$ : number of components | 2-4 | $h_w$ : height of circulating water, mm | 40 |
| $X_1 \ldots X_N$ : components | $SiO_2$,[a] $Al(NO_3)_3$,[b] AMT[c] $H_2O$[d] | $h_g$ : height of precursor, mm | 2 |
| | | $d_m$ : membrane thickness, mm | 0.0254 |
| $w_g$ : total solids concentration, wt.% | 1.5 – 6.0 | *Varied parameters* | *Values* |
| $\dot{V}_p$ : flow rate, mL/min | 0.3-2.1 | $\dot{V}$ : carrier gas flow rate, L/min | 1.4-10 |

AEROSOLIZATION METHOD FOR PRODUCING SOLID PRODUCT PARTICLES HAVING DESIRED CHARACTERISTICS FROM PRECURSOR PARTICLES

TECHNICAL FIELD

The present disclosure is related to systems and methods for controlling the incorporation of materials into solid particles. In particular, the present disclosure is related to aerosol-based systems and methods for selectively incorporating properties of solid precursor particles into processed materials.

BACKGROUND OF THE INVENTION

Aerosol processes have been used to produce solid particles (e.g., metal particles) and powders from precursor mixtures. The produced solid particles can be used for any number of downstream applications, such as for inclusion in batteries, and for use as reaction catalysts.

Conventionally, the produced solid particles include particles of varying shapes, sizes, and compositions based on the characteristics of the precursor materials and on the synthesis and any post-processing processing conditions. Thus, for downstream applications that require the produced particles to be of a specific quality or standard in terms of their characteristics (e.g., size, shape, composition), post-synthesis purification steps must be performed in order to generate particles of sufficient quality. However, these post-synthesis steps can often be challenging and costly, as it can be difficult to manipulate the chemical or physical characteristics of the final solid particles once have they have been produced.

As such, there is a need for systems and methods that can more effectively produce solid particles having desired qualities and characteristics from precursor materials.

SUMMARY

In accordance with one or more embodiments, an aerosol process for selectively incorporating properties of solid precursor particles into processed materials is provided.

In a first aspect, a carrier gas and a precursor mixture are injected into an aerosol generator. The precursor mixture can include solid precursor particles and a liquid component. One or more ultrasonic transducers are applied to the precursor mixture in the aerosol generator to aerosolize a portion of the precursor mixture that comprises solid particles that are smaller than a predetermined size. The aerosolized portion of the precursor mixture is transferred, via the carrier gas, into a reactor, which can be a tube furnace. The aerosolized portion in the reactor is then dried to produce solid product particles, and the solid product particles are collected in a particle collector. In a further aspect, the aerosolized portion is also reacted in the reactor to produce the solid product particles.

In a further aspect, the solid precursor particles included in the precursor mixture comprise a set of particles having variable sizes including a subset having a largest dimension smaller than the predetermined size.

In another aspect, the liquid droplets form over the surface of the solid precursor particles.

In another aspect, to apply one or more ultrasonic transducers to the precursor mixture to aerosolize a portion of the precursor mixture, a local liquid surface tension of the precursor mixture is modified by solid precursor particles in the immediate vicinity to reduce a mean droplet diameter of the formed liquid droplets and thereby the solid precursor particles larger than a predetermined size are prevented from being aerosolized. In a further aspect, the percentage of solid product particles that contain a solid precursor particle that is greater than the predetermined size is substantially less than 1%.

In another aspect, the one or more ultrasonic transducers are operated at a set frequency. In another aspect, the one or more ultrasonic transducers are ultrasonic nebulizers.

In another aspect, the precursor mixture is a solution or a suspension. In another aspect, the solid precursor particles are zeolites. In another aspect, the solid precursor particles are fumed silica particles. In another aspect, the precursor mixture comprises ammonium metatungstate $((NH_4)_6H_2W_{12}O_{40})$.

In another aspect, the carrier gas comprises air. In another aspect, the carrier gas comprises one or more of nitrogen, argon, and helium. In another aspect, to dry the aerosolized portion in the reactor, the aerosolized portion reacts in the reactor and the reactor is heated to between approximately 25° C. to approximately 1500° C.

In a second aspect, an aerosol process is provided in which at least one carrier gas and a precursor mixture is injected into each of a plurality of aerosol generators. The respective precursor mixtures each include respective solid precursor particles and respective liquid components, and each aerosol generator comprises one or more ultrasonic transducers. In the respective aerosol generators, at least a portion of the respective precursor mixtures is aerosolized to form liquid droplets, such that the liquid droplets form over the surface of the respective solid precursor particles and solid precursor particles larger than a respective predetermined size for each aerosol generator are not aerosolized. The respective liquid droplets from the plurality of aerosol generators are combined into a reactor. The liquid droplets from the plurality of aerosol generators in the reactor are dried to produce solid product particles having at least three variations of solid product particles including (1) the aerosolized portion of a first precursor mixture, (2) the aerosolized portion of a second precursor mixture, and (3) a combination of the aerosolized portions of the first and second precursor mixtures. The solid product particles are then collected in a particle collector.

In another aspect, to combine the respective liquid droplets, the respective liquid droplets are carried, via the respective carrier gases, from the plurality of aerosol generators into the reactor. In another aspect, the at least one carrier gas comprises one or more of air, nitrogen, argon, and helium. In another aspect, the at least one carrier gases of the respective aerosol generators have the same composition. In another aspect, the at least one carrier gases of the respective aerosol generators have different compositions.

In another aspect, to aerosolize the portions of the respective precursor mixtures, the local liquid surface tension of the respective precursor mixtures is modified by solid precursor particles in the immediate vicinity to reduce a mean droplet diameter of the respective liquid droplets and to thereby prevent solid precursor particles larger than the predetermined size for each respective aerosol generator from being aerosolized.

These and other aspects, features, and advantages can be appreciated from the accompanying description of certain embodiments of the invention and the accompanying drawing figures and claims.

BRIEF DESCRIPTION OF THE DRAWING FIGURES

Figure 1B:
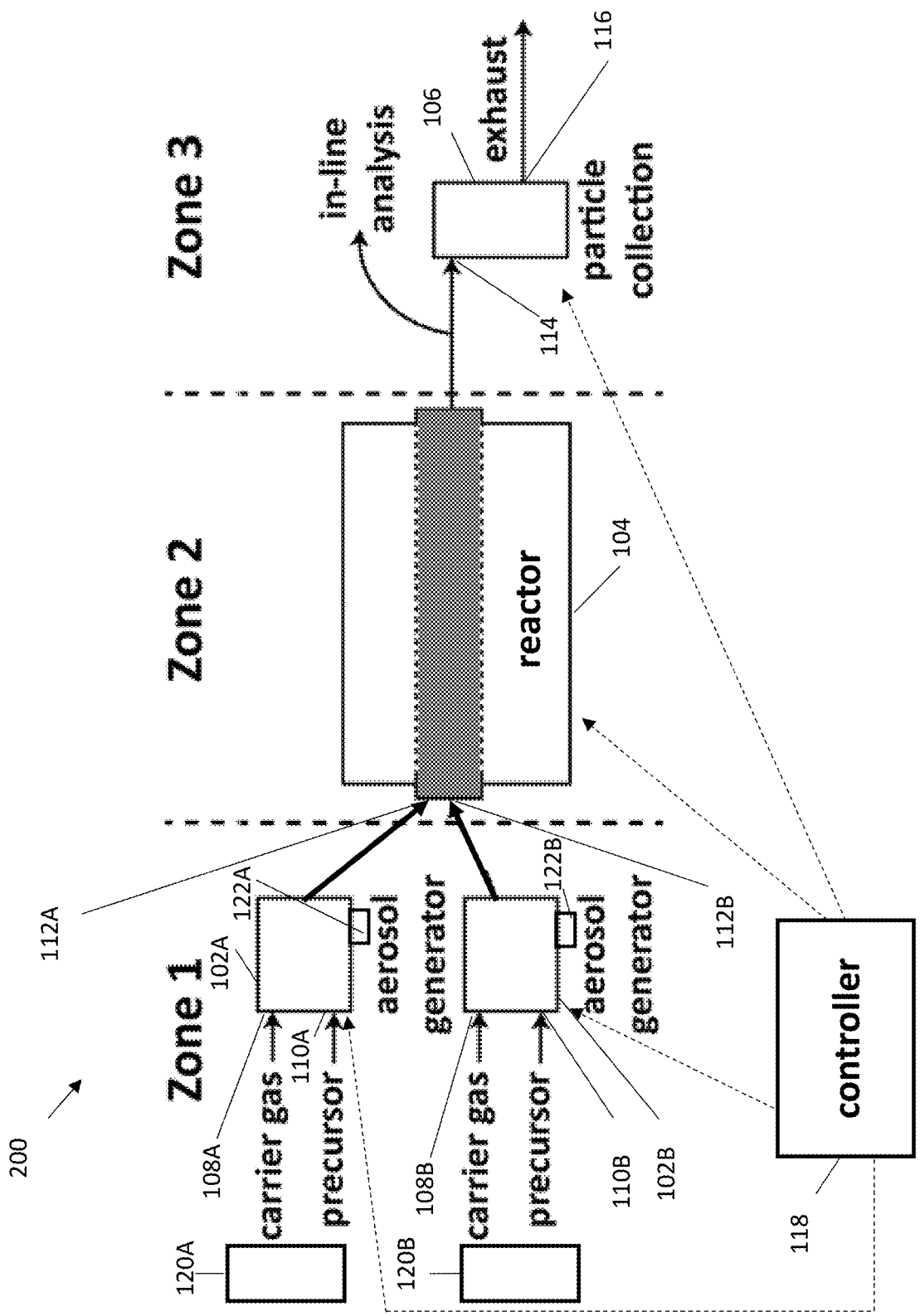
Figure 2:
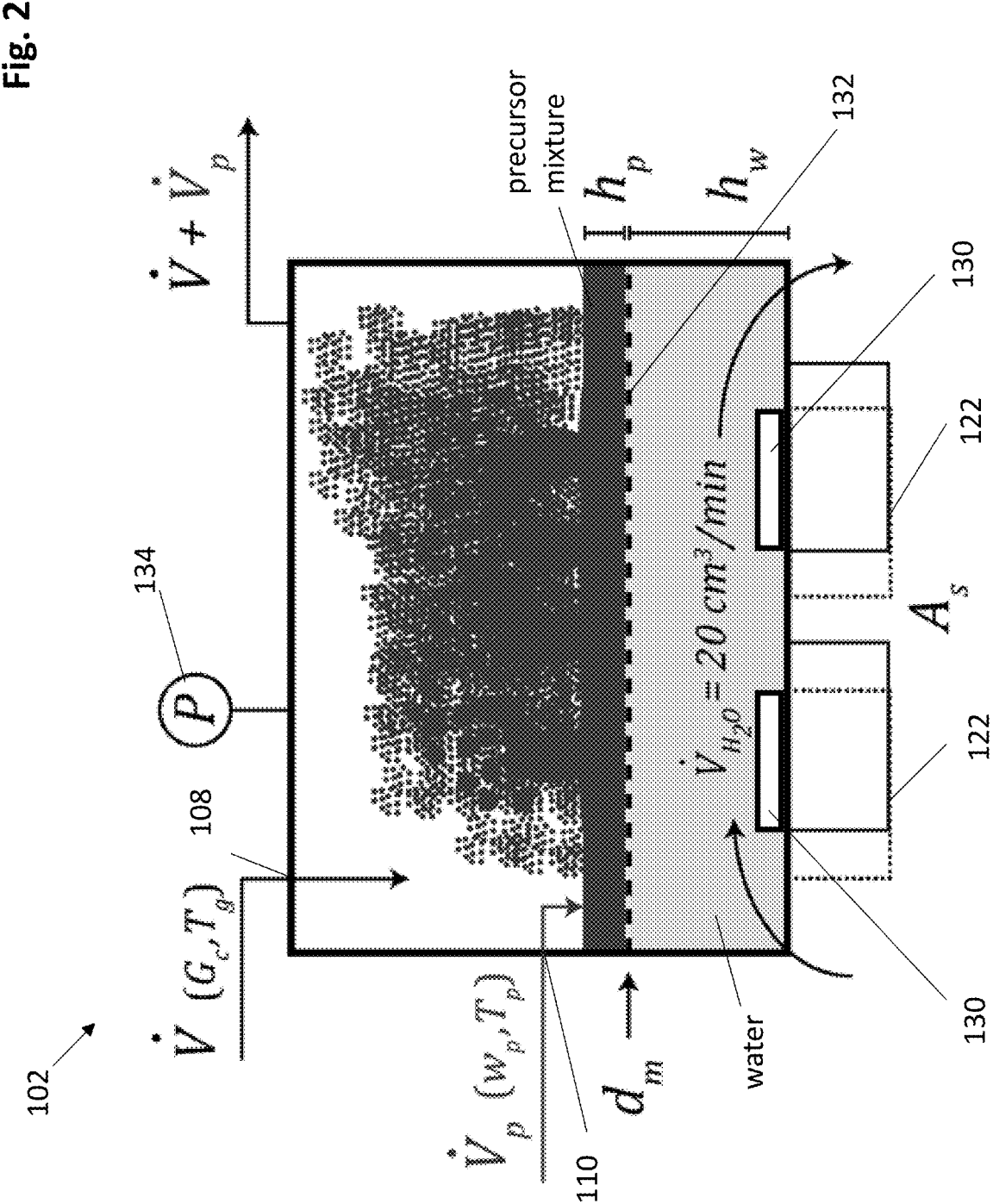
Figure 3A:
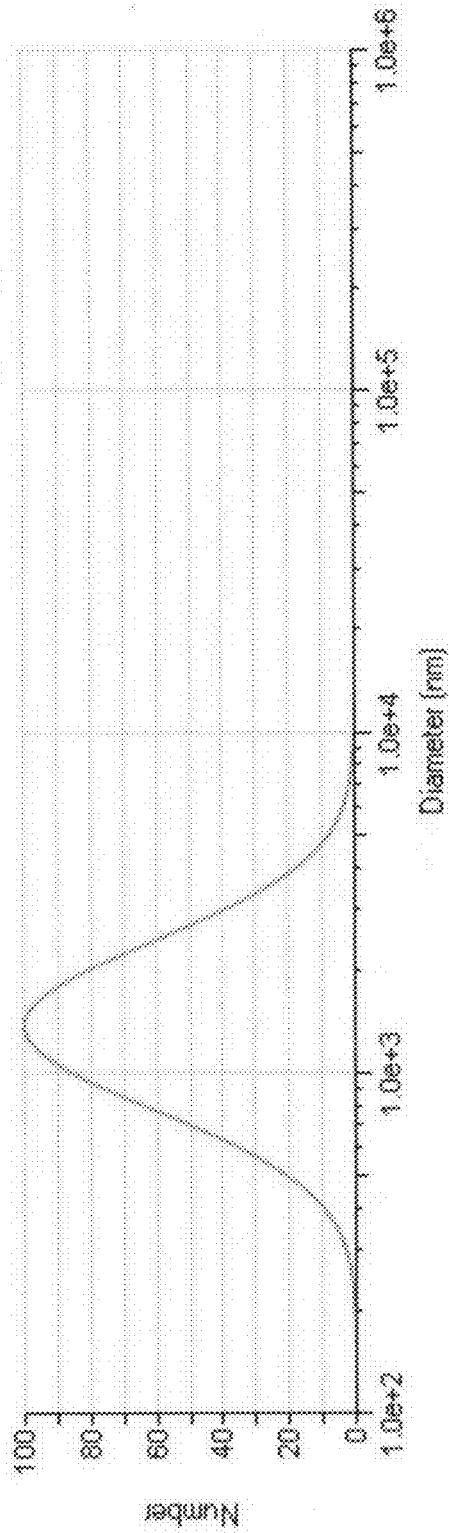
Figure 5:
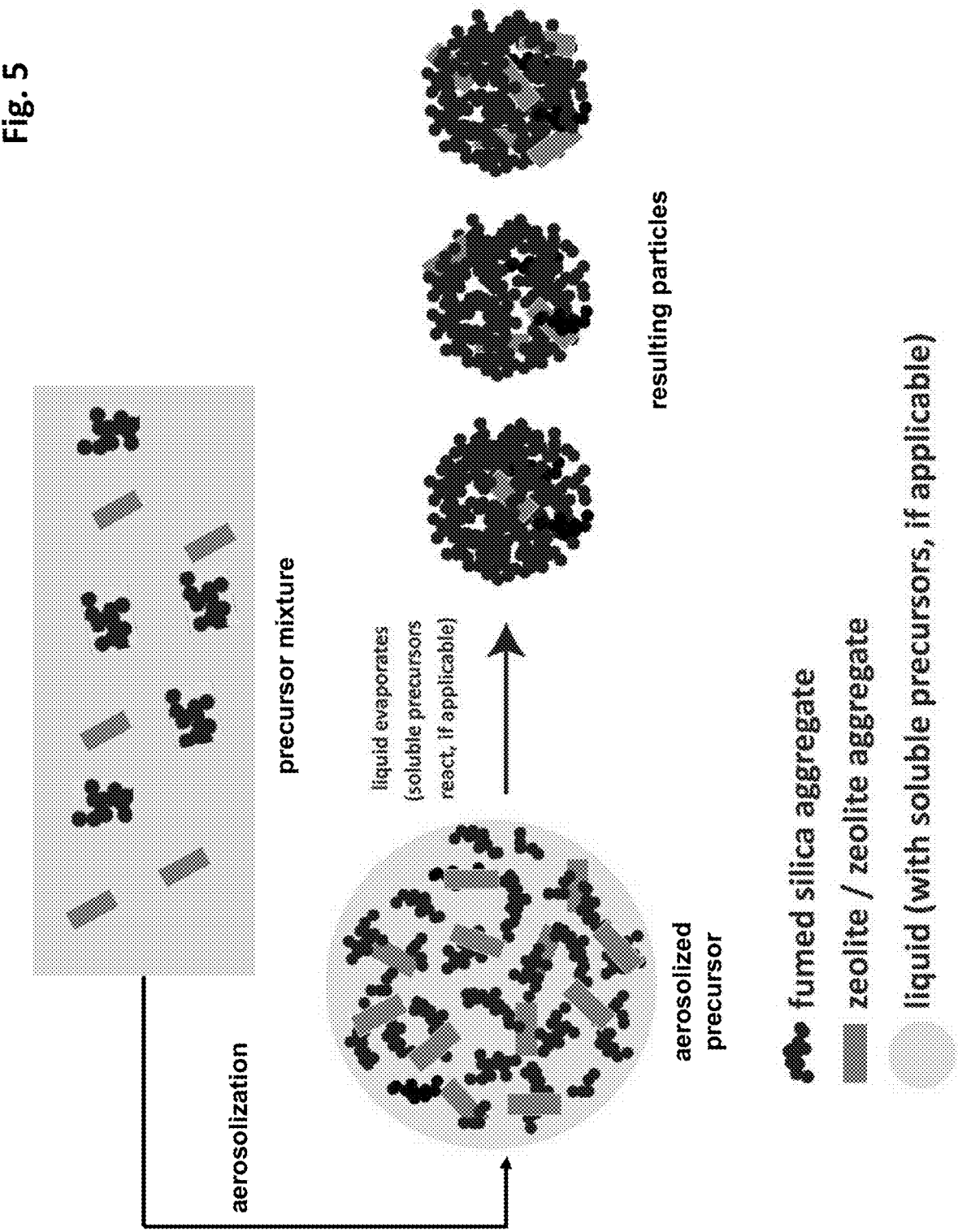
Figure 6:
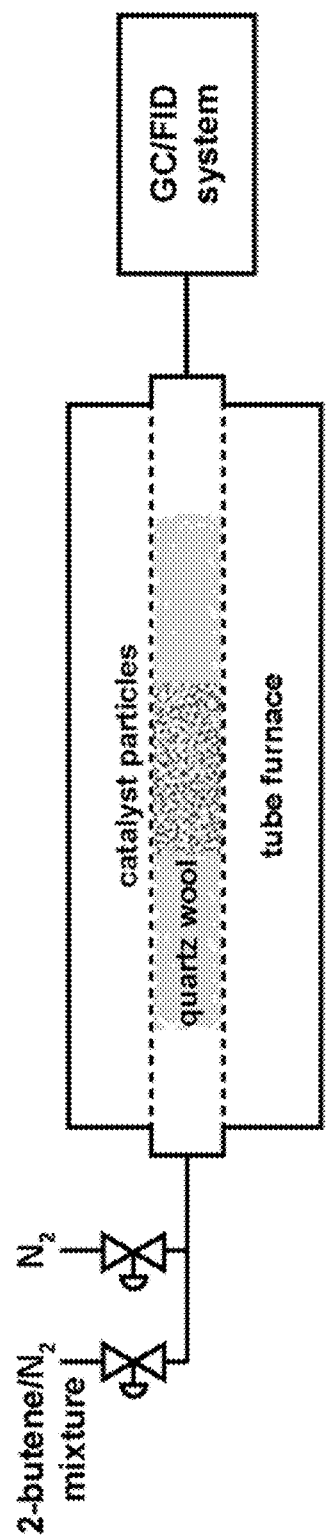
Figure 7:
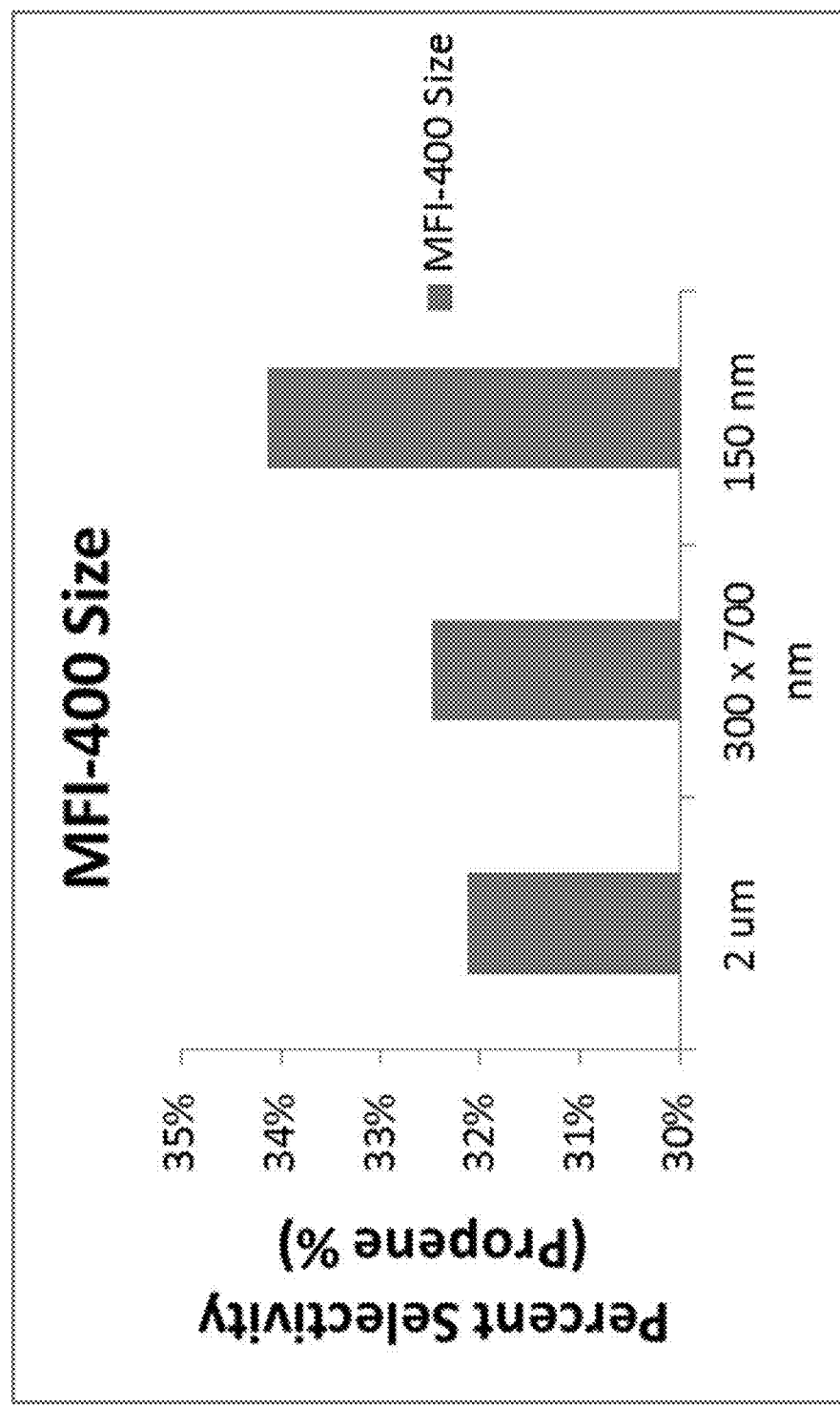

FIG. 1A displays a schematic of an exemplary three-zone aerosol reactor system in accordance with one or more embodiments;

FIG. 1B displays a schematic of another exemplary three-zone aerosol reactor system in accordance with one or more embodiments;

FIG. 2 displays a schematic of an exemplary aerosol generator of the present system in accordance with one or more embodiments;

FIG. 3A shows a table of characteristics of an exemplary precursor mixture, exemplary parameters for operation of the present system, and a graph showing the distribution of size of the precursor particles prior to aerosolization in accordance with at least one embodiment;

FIG. 3B displays a bar graph showing the distributions of the size of the precursor particles aerosolized by an aerosol generator of the present system in accordance with one or more embodiments;

FIG. 4 displays an example table showing various operational parameters that can be controlled for the one or more precursor mixtures and one or more aerosol generators of the present system in accordance with one or more embodiments;

FIG. 5 show diagrams of an exemplary precursor mixture and the solid product particles that are formed from the precursor mixture as a result of the present method in accordance with one or more embodiments;

FIG. 6 shows a diagram of an exemplary catalytic testing system used for testing the catalytic performance of zeolite solid particles formed using the present systems and methods in accordance with one or more embodiments; and FIG. 7 displays a bar graph showing the results of the catalytic testing of the zeolite solid particles formed using the present systems and methods in accordance with one or more embodiments.

DETAILED DESCRIPTION OF CERTAIN EMBODIMENTS OF THE INVENTION

The present application describes systems and methods for selectively incorporating properties of solid precursor particles into processed materials. The present systems and methods include an aerosol process that enables a high level of control over the incorporation of certain precursor materials having desired characteristics into solid particles. In particular, the present systems and methods use one or more ultrasonic transducers in an aerosol reactor to generate a liquid aerosol. The ultrasonic transducers can be used to selectively aerosolize a precursor mixture that comprises solid precursor material based on the size, composition, and/or morphology of the solid precursor materials, and/or the solubility of the solid precursor in the precursor mixture. The liquid aerosol is then carried via a carrier gas to a reactor, where the liquid aerosol is dried, and in certain embodiments reacted, to produce solid product particles having desired characteristics from the precursor materials. The solid product particles with the desired characteristics are then collected in a particle collector.

The present systems and methods can be used to form solid particles with select desired material sizes and other characteristics, especially when other means of post-synthesis classification of precursor materials (e.g., sieving) are not possible or are not sufficient to control the characteristics of the resulting solid particles. Said differently, when starting with solid precursor materials having various characteristics (e.g., ranges of particle size, shape, surface chemistry), the presents systems and methods, via aerosolization, specifically tunes which characteristics and/or what ranges of those characteristics are ultimately incorporated into the final solid particles. For example, in one or more embodiments, the present systems and methods can limit the size of the solid precursor particles that can be aerosolized, thereby limiting size of the resulting solid precursor particles that are included in the product particles. This feature is particularly useful in applications in which larger product particles are deleterious for a downstream process and thus need to be avoided. This feature can also be useful in instances in which smaller sized solid product particles are desirable for downstream operations. For example, in the case of forming catalyst particles containing zeolite solid product particles, smaller zeolite particles can have higher catalytic activity than larger zeolite particles. Therefore, in such an embodiment, it is desirable to selectively aerosolize smaller zeolite precursor materials to form product particles containing smaller zeolites.

The referenced systems and methods for selectively incorporating properties of solid precursor particles into processed materials are now described more fully with reference to the accompanying drawings, in which one or more illustrated embodiments and/or arrangements of the systems and methods are shown. The systems and methods of the present application are not limited in any way to the illustrated embodiment and/or arrangement. It should be understood that the systems and methods as shown in the accompanying figures are merely exemplary of the systems and methods of the present application, which can be embodied in various forms as appreciated by one skilled in the art. Therefore, it is to be understood that any structural and functional details disclosed herein are not to be interpreted as limiting the systems and methods, but rather are provided as a representative embodiment and/or arrangement for teaching one skilled in the art one or more ways to implement the systems and methods.

FIG. 1A displays a schematic of an exemplary three-zone aerosol reactor system 100. The first zone (zone 1) of the system 100 comprises an aerosol generator 102, the second zone (zone 2) comprises a reactor 104, and the third zone (zone 3) comprises a particle collector 106. The system 100 can further include a controller 118, the controller 118 that includes a microprocessor and a memory. The controller 118 can also include code executed by the microprocessor such that the code allows the controller 118 to implement one or more of the steps discussed herein. For instance, the controller 118 can be operatively connected to the aerosol generator 102, reactor 104, and/or particle collector 106, and can be configured, via the executed code, to control the operating conditions (e.g., temperature, pressure) of the aerosol generator 102, reactor 104, and/or particle collector 106.

The aerosol generator 102 is in fluid communication with the reactor 104, and the reactor is in fluid communication with the particle collector 106. In one or more embodiments, the aerosol generator 102 comprises one or more ultrasonic transducers 122 located within the generator and configured to aerosolize precursor materials. In particular, the one or more ultrasonic transducers are configured to apply ultrasonic energy to the precursor mixture (sonicate the precursor mixture) in order to aerosolize a portion of the precursor mixture that comprises solid particles that are smaller than a predetermined size. The one or more ultrasonic transducers 122 can be positioned or repositioned within the aerosol generator 102 to optimize the aerosolization of the particular precursor mixture depending on the type of precursor mixture, the dimensions of the aerosol generator, and the desired characteristics of the solid product particles. For instance, when in use, the one or more ultrasonic transducers apply ultrasonic energy (ultrasonic sound waves) into the chamber. The dimensions of the aerosol generator and the frequency of the waves allow the aerosol generator 102 to produce liquid droplets from the liquid component (e.g., water, ethanol, isopropyl alcohol) of the particular precursor mixture. In at least one embodiment, to aerosolize solid precursor particles of a desired size and/or other characteristic, the location of the ultrasonic transducer(s) in the aerosol generator and the frequency of the ultrasonic waves can be changed to provide favorable conditions for desired droplet formation.

The aerosol generator 102 can further comprise a carrier gas inlet 108 and a precursor material inlet 110. In one or more embodiments, to begin the process, a carrier gas is injected by an injector 120 into the aerosol generator 102 via inlet 108 and a precursor material is injected by the injector 120 into the aerosol generator 102 via inlet 110. In one or more embodiments, the carrier gas can comprise air. In certain embodiments, the carrier gas can comprise one more elements, including nitrogen, argon, and helium. In at least one embodiment, the carrier gas can comprise one or more reactive gases such as $SiH_4$ or a combination of reactive and inert gases.

In one or more embodiments, the precursor materials injected into the aerosol generator 102 can be a precursor mixture that includes solid precursor particles and a liquid component. In one or more embodiments, the liquid component comprises water. In at least one embodiment, the liquid component can comprise one or more solvents, such as ethanol. In at least one embodiment, the solid precursor particles can comprise fumed silica particles, fumed alumina particles, colloidal silica, and/or zeolite particles. The precursor mixture can be in the form of a solution or a suspension. In at least one embodiment, the precursor mixture can also comprise $Al(NO_3)_3$. In other embodiments, the precursor mixture can comprise $AlCl_3$, $AlPO_4$, and/or $Al_2(SO_4)_3$. In at least one embodiment, the precursor mixture can comprise ammonium metatungstate $((NH_4)_6H_2W_{12}O_{40})$.

In one or more embodiments, the three-zone aerosol reactor system can comprise multiple aerosol generators. For instance, FIG. 1B displays a schematic of an exemplary three-zone aerosol reactor system 200 which comprises two aerosol generators 102A and 102B. In this embodiment, at least one carrier gas and a precursor mixture are injected into each of the two aerosol generators 102A and 102B. The aerosol generators 102A and 102B comprise carrier gas inlets 108A and 108B, precursor inlets 110A and 110B, injectors 120A and 120B, and one or more ultrasonic transducers 122A and 122B, respectively. The carrier gas(es) for the two aerosol generators 102A and 102B can have substantially the same composition or can have different compositions. Similarly, the precursor mixtures for the two aerosol generators 102A and 102B can have substantially the same composition or can have different compositions. Additionally, the two aerosol generators 102A and 102B can operate at substantially the same operating parameters or at different operating parameters.

In an embodiment as shown in FIG. 1B, the two aerosol generators can be used such that precursor mixtures having different compositions or characteristics can be simultaneously aerosolized in the separate aerosol generators according to operational parameters specifically tailored to the respective precursor mixtures. This embodiment allows the system to aerosolize the respective precursor mixtures separately such that the resulting liquid droplets from one aerosol generator can incorporate precursor materials having different characteristics (e.g., great or small sized precursor particles) than the precursor materials incorporated in the liquid droplets of the other aerosol generator. The production of liquid droplets in the two respective aerosol generators having precursors of differing characteristics results in the final solid product particles having varying characteristics as discussed in further detail below. It should be understood that while FIGS. 1A and 1B display embodiments of the present system that comprise one and two aerosol generators, respectively, in other embodiments more than two separate aerosol generators can be included in the system.

In at least one alternative embodiment of FIG. 1B, the aerosol generator 102A or 102B, but not both, can utilize other aerosolization methods, such as spray drying or evaporation/condensation methods. It is noted that the spray drying and evaporation/condensation methods do not allow for control over the solid particles that are incorporated into the final product particles. As such, in order to maintain this advantage of the present systems and methods, at least one of the aerosol generators (102A or 102B) needs to utilize the ultrasonic transducer approach.

Referring to FIGS. 1A and 1B, at least a portion of the injected precursor mixture for each aerosol generator 102 (or 102A, 102B) is aerosolized using the one or more ultrasonic transducers resulting in the formation of liquid droplets. In one or more embodiments, the liquid droplets, which can comprise the liquid component of the precursor mixture, water, and/or any soluble species, form over the surface of certain solid precursor particles and solid precursor particles larger than a predetermined size are not aerosolized. For instance, in one or more embodiments, in aerosolizing the precursor mixture, the local liquid surface tension (a) of the precursor mixture is modified to reduce the mean droplet diameter of the formed liquid droplets. In particular, in one or more embodiments, the local liquid surface tension of the precursor mixture is modified by the solid precursor particles in the immediate vicinity to reduce the mean droplet diameter of the formed liquid droplets. The modification of the local liquid surface tension of the precursor mixture prevents solid precursor particles larger than a predetermined size from aerosolizing in the aerosol generator 102. In at least one exemplary embodiment, the predetermined size is 1 µm, and thus the aerosol generator 102 is configured to only aerosolize solid precursor particles that are less than or equal to 1 µm in size. In one or more embodiments, the predetermined size of the precursor particles can be in the range of approximately 0.5 µm to approximately 3 µm. In one or more embodiments, the predetermined size can be any size so long as the solid precursor particle is smaller than the generated liquid droplet. In this embodiment, there is no lower limit for the size of the solid particle that can be incorporated into the generated droplets.

As described herein, the size of the solid precursor particles refers to the largest dimension of the solid precursor particle. As such, for those solid precursor particles that are aerosolized in the aerosol generator in accordance with one or more embodiments of the present application, the largest dimension of the solid precursor must be smaller than the prescribed predetermined size. The present systems and methods can be used for solid precursor particles of various shapes, including irregular-shaped particles and spherically-shaped particles. In embodiments in which the solid precursor particles are spherical in shape, the size of the solid precursor particles can be referred to as the diameter of the solid precursor particles. As such, in these embodiments, the diameter of the spherical solid precursors must be smaller than a prescribed predetermined diameter in order for the spherical solid precursor to be aerosolized.

In at least one embodiment, the ultrasonic transducers that aerosolize at least a portion of the precursor material can be an array of ultrasonic transducers. In one or more embodiments, the ultrasonic transducers can be ultrasonic nebulizers. The ultrasonic transducers can be operated at a frequency in the range or approximately 200 kHz to approximately 10 MHz. In at least one embodiment, the ultrasonic transducers can be operated at a set frequency. For example, in at least one embodiment, the ultrasonic transducers can run at a frequency of approximately 2.4 MHz. To aerosolize the precursor mixture, the energy is applied to the transducer(s) at a set frequency to cause droplets to form over the surface of the precursor particles. The ultrasonic transducers produce a distribution of various sized liquid droplets that depends on several parameters. In embodiments in which there are multiple aerosol generators (e.g., FIG. 1B), the arrangement of the ultrasonic transducers can be substantially the same across all the aerosol generators, or alternatively can be different between the respective aerosol generators.

A schematic of an exemplary aerosol generator 102 is shown at FIG. 2. In one or more embodiments, as exemplified in FIG. 2, the one or more ultrasonic transducers 122 are mounted at the bottom of the aerosol generator 102. The ultrasonic transducers 122 can each include a housing and electronics located within the housing. In one or more embodiments, the ultrasonic transducers 122 can further include piezoelectric crystals 130.

The aerosol generator 102 can also comprise a membrane 132 (e.g., polyimide membrane) located above the transducers 122, and between the liquid and the precursor solution. The membrane 132 allows for cooling water to extend the lifetime of the transducers and to protect the piezoelectric crystals 130 from potential degradation upon exposure to the precursor solution, particularly in instances in which the precursor solution is reactive or corrosive. In one or more embodiments, the aerosol generator 102 can further comprise a pressure transducer 134 configured to control the pressure of the aerosol generator 102 such that it does not become excessively pressurized during operation.

As shown in FIG. 2, $\dot{V}_p$ is the volumetric flow rate that the precursor mixture flows into the aerosol generator 102, $\dot{V}$ is the volumetric flow rate of the carrier gas entering the aerosol generator 102, and $\dot{V}_{H2O}$ is the volumetric flow rate of the water in and out of the aerosol generator 102. In one or more embodiments, and as shown in the example of FIG. 2, the $\dot{V}_{H2O}$ is 20 cm$^3$/min. The volumetric flow rate of the carrier gas and the aerosolized precursor from the aerosol generator 102 to the reactor is $\dot{V}+\dot{V}_p$. Additionally, $h_p$ refers to the height of the precursor mixture in the aerosol generator 102, and $h_w$ refers to the height of the liquid precursor in the aerosol generator 102 and the distance between the transducer surface and the membrane 132.

The governing equation for the liquid droplet size generated by the ultrasonic transducer(s) is:

$$d_{drop} = 0.34 \left( \frac{8\pi\sigma}{\rho f^2} \right)^{1/3}$$

where $d_{drop}$ is the mean drop diameter generated, $\sigma$ is the precursor liquid surface tension (mN/m), $\rho$ is the liquid density (g/cm$^3$), and f is the transducer frequency (Hz). For example, in an exemplary embodiment that uses a frequency of 2.4 MHz and assuming the physical properties of water at 20° C. ($\sigma$=72.9 mN/m; $\rho$=1.0 g/cm$^3$), the estimated generated droplet diameter is 2.1 μm.

In one or more embodiments of the present system, solid precursor particles greater than the predetermined size (e.g., diameter) are not aerosolized and thus are not incorporated into the solid product particles. In one or more embodiments, the percentage of solid product particles that contain a solid precursor particle that is greater than the predetermined size is less than 1%, and in certain embodiments substantially less than 1%. This selective aerosolization of precursor particles not greater than the predetermined size is accomplished by modifying the precursor liquid surface tension ($\sigma$). By modifying the precursor liquid surface tension ($\sigma$), incorporation of precursor particles into the liquid droplets via aerosolization can be impacted. For example, in instances in which the precursor liquid surface tension becomes too large or too small to generate droplets, the precursor particles that contribute to the precursor liquid surface tension are not incorporated since no droplet is formed. In at least one embodiment, large particles are selectively disallowed from being aerosolized, and thus no large particles are found in the solid product particles.

It should be noted that, in general, the surface tension of colloids can be altered by concentration and by the size of colloidal particles, as well as the hydrophobic/hydrophilic nature of the particles. The effect is related to the contact angle of the particles with the liquid/air interface. The hydrophobic effect is based on the excess concentration of hydrophobic particles in water being located at the surface versus in the bulk. Surface tension of a fluid can also be reduced in the presence of surfactants.

Thus, solid precursor particles having a size (e.g., diameter), $d_p$, greater than the $d_{drop}$ are not efficiently aerosolized or not aerosolized at all in accordance with the present systems and methods. In other words, the atomization efficiency for solid precursor particles having a $d_p > d_{drop}$ is 0. For instance, in embodiments in which the mean drop diameter, $d_{drop}$, is 1 μm, solid precursor particles must have a $d_p < 1$ μm to be aerosolized. In at least one embodiment, the precursor particle size (e.g., diameter) of those particles that are successfully aerosolized is substantially smaller than the mean drop diameter of the liquid droplet.

In at least one embodiment, a surface coating can be applied to at least a portion of the solid precursor particles prior to injection of the precursor particles into the aerosol generator. The surface coating on the solid precursor particles can affect the precursor liquid surface tension, and thereby affect the incorporation of the coated solid precursor particles into liquid droplets in the aerosol generator. For example, one or more surfactants can be used as surface coatings for a portion of the solid precursor particles, and the surfactant can affect the precursor liquid surface tension such that those precursor particles that are coated are not aerosolized in the aerosol generator and the precursor particles without the coating are thus preferentially aerosolized. Several types of materials can be used as surfactant surface coatings in accordance with one or more embodiments, including but not limited to organosilanes, silylated polymers, and amine terminated small molecules.

In at least one embodiment, the shape of the final product particles can be selected for based on the operational parameters of the aerosol generator(s). In other words, the aerosol generator can be configured to manipulate the shape of the resulting solid product particles.

FIGS. 3A and 3B show data for operation of an exemplary system of the present application in accordance with one or more embodiments. In particular, FIG. 3A shows a table of exemplary characteristics of a precursor mixture that comprises a 1% suspension of zeolite (MFI-400) in water and the conditions used by the instrument to collect the size distribution. FIG. 3A also displays a graph showing the distribution of size of the precursor suspension containing 1% MFI-400 in water prior to aerosolization.

FIG. 3B shows a bar graph comprising aerosolization data for an exemplary aerosol generator, the data being collected using an electrostatic low pressure impactor (ELPI). In particular, FIG. 3B shows the size distribution of the same material described above for FIG. 3A after aerosolization. The graph of FIG. 3B shows that in the present process, the size distribution of the particles that are incorporated into the liquid droplet significantly changes due to the ability or inability of the ultrasonic transducers to aerosolize based upon surface tension, which is a function of particle size. In the examples of FIGS. 3A and 3B, the suspension of solid precursor particles in liquid was made at very low concentration to prevent multiple solid particles from ending up in a single liquid droplet. The suspension of the precursor particles was then aerosolized. The particles were then dried by evaporating off the liquid carrier in a reactor. The resulting solid product particles were then measured and the resulting size distribution in the aerosol phase was determined with an ELPI (FIG. 3B), that is, the size distribution of the solid particles that were aerosolized. The size distribution of the solid particles that were aerosolized can then be compared with the original size distribution of the initial suspension (FIG. 3A).

The graph of FIG. 3B shows the number distributions of aerosolized precursor particles from the aerosol generator. As shown by the graph of FIG. 3B, the overwhelming majority of the aerosolized precursor particles had a size (e.g., diameter) between 0.01 μm and 1 μm, with a very minimal number of precursor particles greater than 1 μm in size (e.g., diameter) being formed, despite these larger particles being highly present in the precursor mixture. The results shown in FIGS. 3A and 3B verify that despite the precursor material having significant number of particles >1 μm (as shown in FIG. 3A), there were essentially no particles >1 μm that were aerosolized (as shown in FIG. 3B). Thus, this data shows that the aerosol generator of the present system provides a mechanism for selectively excluding precursor particles of a particular size, thereby selectively determining which sized precursor particles are included in the solid product particles before the solid product particles are formed.

As such, in one or more embodiments, the present system enables one to enrich the final solid product particles with more "fines" (i.e., small particles) and reduce or even eliminate the presence of large particles in the final solid product particles. This feature can be particularly advantageous in applications in which particles above a certain size can cause defects or abnormalities in downstream applications (e.g., electronic applications), or in applications in which "fines" are highly desirable (e.g., formation of catalysts).

FIG. 4 displays an exemplary table of various operational parameters that can be controlled for the one or more precursor mixtures and the one or more aerosol generators in order to produce liquid droplets and ultimately solid product particles having desired characteristics. The parameters for the precursor mixture can include initial temperature, sonication time, the number of components in the precursor mixture, the types of components, the total solid concentrations, and the flow rate. For the aerosol generator, the parameters can include atomization source, carrier gas composition, gas inlet temperature, system pressure, height of circulating water, height of precursor, membrane thickness, and carrier gas flow rate. In certain embodiments, and as shown in the exemplary table of FIG. 4, certain operation parameters can be fixed while others can be varied depending on the aims of the user (e.g., the desired characteristics of the final product) and the precursor materials that are used. It should be understood, however, that any of the operational parameters shown in FIG. 4 can be can be varied or fixed for any particular run of the aerosol generator, depending on the aims of the user. It should also be noted that the values provided in the table of FIG. 4 are merely illustrative and can be varied greatly depending on the product characteristics desired from the process.

Referring back to FIGS. 1A and 1B, after aerosolization of at least a portion of the precursor mixture in each of the one or more aerosol generators 102 (or 102A, 102B), the resulting liquid droplets are transferred from the aerosol generator 102 to the reactor 104 via an inlet 112 in the reactor (FIG. 1A). The liquid droplets are carried from the aerosol generator 102 to the reactor 104 by the carrier gas. In the embodiment of FIG. 1B, the two aerosol generators (102A and 102B) can transfer their respective liquid droplets to the reactor 104 via separate inlets 112A and 112B. In at least one alternative embodiment, the liquid droplets of the two aerosol generators (or in other implementations, greater than two aerosol generators) can be combined in a single channel before being transferred to the reactor 104 via a single inlet in the reactor 104.

In the reactor 104, the liquid droplets from the aerosol generator(s) are heated (dried) to eliminate the liquid and produce solid product particles. In one or more embodiments, depending on the composition of the aerosolized precursor, the precursor can also be reacted in the reactor 104. In one or more embodiments, the reactor is a fixed bed reactor. In one or more embodiments, the reactor 104 is a tube furnace. In one or more embodiments, the reactor 104 can be heated to a temperature in the range of approximate 25° C. to approximately 1500° C. In one or more embodiments, the reactor 104 can have multiple heating zones that can be operated at varying temperature. In at least one embodiment, the reactor 104 can have a single heating zone. The reactor is generally run at atmospheric pressure. In one or more embodiments, the residence time of the aerosolized precursor in the reactor 104 ranges from approximately 0.1-10 seconds, depending on the aims of the user, as well as other factors, such as power input and temperature, for example.

As the aerosolized precursor dries in the reactor 104, the precursor materials can react to form various structures (e.g., amorphous structures, crystalline structures) depending on the composition of the precursor mixture and the operating conditions of the reactor 104. In embodiments in which there are multiple aerosol generators (e.g., two aerosol generators 102A, 102B), the liquid droplets from the plurality of aerosol generators are dried in the reactor 104 to produce solid product particles having at least three variations of solid product particles including: (1) the aerosolized portion of a first precursor mixture (e.g., the precursor mixture of the first aerosol generator 102A), (2) the aerosolized portion of the second precursor mixture (e.g., the precursor mixture of the second aerosol generator 102B), and (3) a combination of the aerosolized portions of the first and second precursor mixtures.

After drying, and in certain embodiments reacting, in the reactor 104, the dried solid product particles are carried by the carrier gas to the particle collector 106 where they are collected. The particle collector 106 can include an inlet 114 for receiving the dried solid product particles from the reactor 104, and an exhaust 116, through which the carrier gas exits the system. In at least one embodiment, a portion of the collected solid product particles can be separated for in-line analyses. In one or more embodiments, the particle collector 106 can be a filter. In one or more embodiments, the particle collector 106 can be a bag house, a cyclone separator, or another device configured to separate solids from gases.

FIG. 5 shows a diagram of the exemplary precursor mixtures for use in the present system and the respective solid product particles that are formed as a result of the present method. In particular, FIG. 5 shows a precursor mixture (top image of FIG. 5) that comprises fumed silica as the primary precursor particle and solid zeolite particles. In this example, the fumed silica particles are aggregates, and when they are placed into a liquid, they form a solid suspension of small aggregates (top image and far left image of FIG. 5). As the liquid droplet dries in the reactor, the small aggregates concentrate together into an agglomerate (far right diagrams of FIG. 5). When the drying is complete, the resulting solid product particles are in the shape of spherical agglomerate particles that have high surface area and porosity due to the large boundary of fractal dimension ($D_f$) of the fumed silica aggregates from the precursor mixture. These solid particles contain a combination of fumed silica aggregates and zeolites particles (less than <1 μm).

In at least one embodiment, the present application provides systems and methods for selectively determining the size of solid precursor particles that can be aerosolized by the one or more aerosol generators, thereby limiting the size of the solid product particles after drying of the aerosolized precursor. In other words, the present systems and methods allows one to select the desired properties (e.g., size) of the solid product particles prior to synthesis (i.e., drying step) of the solid product particles instead of relying on post-synthesis techniques for determining the properties of the solid product particles. In the present systems and methods, only particles with desired characteristics are produced, thereby increasing the energy efficiency and production rate of final products for the present systems and methods relative to conventional systems and methods. The present systems and methods are particularly effective for selectively tailoring multiple precursor components in separate aerosol generators and then combining these components to form a single group of composite solid product particles. The ability to create such composite solid product particles would be exceptional difficult to do using only conventional synthesis and purification steps.

This pre-synthesis control over the solid product particles can be particularly useful for production of specific types of products, such as catalysts, for various downstream operations. For example, FIG. 6 shows a diagram of an exemplary catalytic testing system used for testing the catalytic performance of smaller zeolite particles relative to large zeolite particles in accordance with one or more embodiments. The test zeolite particles were produced via the present systems and methods. In one example using the catalytic testing system, the catalytic testing was performed using a fixed bed reactor (e.g., tube furnace) comprising the zeolite catalyst particles. The testing was performed at 580° C. with a flow of 5 mL/min of 10% w/w 2-butene: balance nitrogen. The catalytic testing data with recorded between times 4.5 hours and 6.5 hour on a gas chromatography/flame ionization detector (GC/FID) system to assure the materials in the reactor had reached a steady state. In this example, a 9:1 w/w Metathesis/Zeolite (MFI-400) catalyst with various sized particles (as determined by SEM imaging) was tested.

FIG. 7 is a bar graph showing the results of the catalytic testing. More specifically, the bar graph of FIG. 7 demonstrates that the zeolite having small particle sizes boosted the catalytic performance of the material. In particular, as shown in the bar graph of FIG. 7, the smallest MFI-400 catalyst particles (150 nm) performed better for selectivity to propylene relative to the larger MFI-400 catalyst particles (2 μm and 300×700 nm). As such, this example shows that the present systems and methods can improve the efficiency of the production of catalyst particles with greater catalytic activity via pre-synthesis control of the size of the aerosolized precursor particles.

While much of the foregoing description focuses on limiting the size of solid precursor materials during aerosolization to reduce the size of the solid product particles, the present systems and methods can also be used to selectively manipulate the solubility, shape/morphology, surface chemistry, and/or other features of the precursor materials to increase aerosolization efficiency and for further tailoring of the characteristics of the solid product particles. For example, the solubility of certain precursor materials in the precursor mixture can be modified by changing the chemical composition of the precursor mixture (e.g., adding a solvent). A change in solubility of a precursor material in the precursor mixture can affect the shape and the composition of the resulting solid product particles after drying (see FIG. 5). In at least one embodiment, precursor particles can be selectively aerosolized based on their hydrophobic or hydrophilic properties by coating the precursor particles in substance that modify their hydrophobicity or hydrophilicity.

Although much of the foregoing description has been directed to systems and methods for selectively incorporating properties of solid precursor particles into processed materials, the system and methods disclosed herein can be similarly deployed and/or implemented in scenarios, situations, and settings far beyond the referenced scenarios. It should be further understood that any such implementation and/or deployment is within the scope of the system and methods described herein.

It is to be further understood that like numerals in the drawings represent like elements through the several figures, and that not all components and/or steps described and illustrated with reference to the figures are required for all embodiments or arrangements. Further, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms ""including," "comprising," or "having," "containing," "involving," and variations thereof herein, when used in this specification, specify the presence of stated features, integers, steps, operations, elements, and/or components, but do not preclude the presence or addition of one or more other features, integers, steps, operations, elements, components, and/or groups thereof.

It should be noted that use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

The subject matter described above is provided by way of illustration only and should not be construed as limiting. Various modifications and changes can be made to the subject matter described herein without following the example embodiments and applications illustrated and described, and without departing from the true spirit and scope of the present invention, which is set forth in the following claims.

What is claimed:

1. An aerosol process for selectively incorporating properties of solid precursor particles into processed materials, the process comprising:
   injecting a carrier gas and a precursor mixture into an aerosol generator, wherein the precursor mixture includes solid precursor particles and a liquid component;
   applying a surface coating to at least a portion of the solid precursor particles prior to injection of the precursor particles into the aerosol generator, wherein the surface coating is an organosilane, a silylated polymer, or an amine terminated small molecule;
   applying one or more ultrasonic transducers to the precursor mixture in order to aerosolize a portion of the precursor mixture that comprises solid particles that are smaller than a predetermined size to form liquid droplets, wherein the portion of the solid precursor particles that is coated with the surface coating is not aerosolized;
   transferring, via the carrier gas, the aerosolized portion of the precursor mixture into a reactor;
   drying the aerosolized portion in the reactor to produce solid product particles; and
   collecting the solid product particles in a particle collector.

2. The aerosol process of claim 1, wherein the solid precursor particles included in the precursor mixture comprise a set of particles having variable sizes including a subset having a largest dimension smaller than the predetermined size.

3. The aerosol process of claim 1, wherein the liquid droplets form over the surface of the solid precursor particles.

4. The process of claim 1, wherein the step of applying one or more ultrasonic transducers to the precursor mixture to aerosolize a portion of the precursor mixture comprises:
   modifying, by solid precursor particles in the immediate vicinity, a local liquid surface tension of the precursor mixture to reduce a mean droplet diameter of the formed liquid droplets and thereby prevent solid precursor particles larger than a predetermined size from being aerosolized.

5. The process of claim 4, wherein the percentage of solid product particles that contain a solid precursor particle greater than the predetermined size is substantially less than 1%.

6. The process of claim 1, wherein the one or more ultrasonic transducers are operated at a set frequency.

7. The process of claim 1, wherein the one or more ultrasonic transducers are ultrasonic nebulizers.

8. The process of claim 1, wherein the precursor mixture is a solution or a suspension.

9. The process of claim 1, wherein the solid precursor particles are zeolites.

10. The process of claim 1, where in the solid precursor particles are fumed silica particles.

11. The process of claim 1, wherein the precursor mixture comprises ammonium metatungstate $((NH_4)_6H_2W_{12}O_{40})$.

12. The process of claim 1, wherein the carrier gas comprises air.

13. The process of claim 1, wherein the carrier gas comprises one or more of nitrogen, argon, and helium.

14. The process of claim 1, wherein the drying step comprises reacting the aerosolized portion and heating the reactor to between approximately 25° C. to approximately 1500° C.

15. An aerosol process for selectively incorporating properties of solid precursor particles into processed materials, the process comprising:
   injecting at least one carrier gas and a precursor mixture into each of a plurality of aerosol generators, wherein the respective precursor mixtures each include respective solid precursor particles and respective liquid components, and wherein each aerosol generator comprises one or more ultrasonic transducers;
   applying a surface coating to at least a portion of the respective solid precursor particles prior to injection of the respective solid precursor particles into the plurality of aerosol generators, wherein the surface coating is an organosilane, a silylated polymer, or an amine terminated small molecule;
   aerosolizing, in the respective aerosol generators, at least a portion of the respective precursor mixtures to form liquid droplets, wherein the portion of the respective solid precursor particles that is coated with the surface coating is not aerosolized;
   combining the respective liquid droplets from the plurality of aerosol generators into a reactor;
   drying the liquid droplets from the plurality of aerosol generators in the reactor to produce solid product particles having at least three variations of solid product particles including (1) the aerosolized portion of a first precursor mixture, (2) the aerosolized portion of a second precursor mixture, and (3) a combination of the aerosolized portions of the first and second precursor mixtures; and
   collecting the solid product particles in a particle collector.

16. The process of claim 15, wherein the step of combining the respective liquid droplets comprises:
   carrying, via the respective carrier gases, the respective liquid droplets from the plurality of aerosol generators into the reactor.

17. The process of claim 16, wherein the at least one carrier gas comprises one or more of air, nitrogen, argon, and helium.

18. The process of claim 15, wherein the at least one carrier gases of the respective aerosol generators have the same composition.

19. The process of claim 15, wherein the at least one carrier gases of the respective aerosol generators have different compositions.

20. The process of claim 15, wherein the step of aerosolizing comprises:
   modifying, by solid precursor particles in the immediate vicinity, the local liquid surface tension of the respective precursor mixtures to reduce a mean droplet diameter of the respective liquid droplets and thereby prevent solid precursor particles larger than the predetermined size for each respective aerosol generator from being aerosolized.

* * * * *